Oct. 14, 1924. 1,511,915
T. W. SHERK
ICE CREAM DISPENSER
Filed Dec. 21, 1922
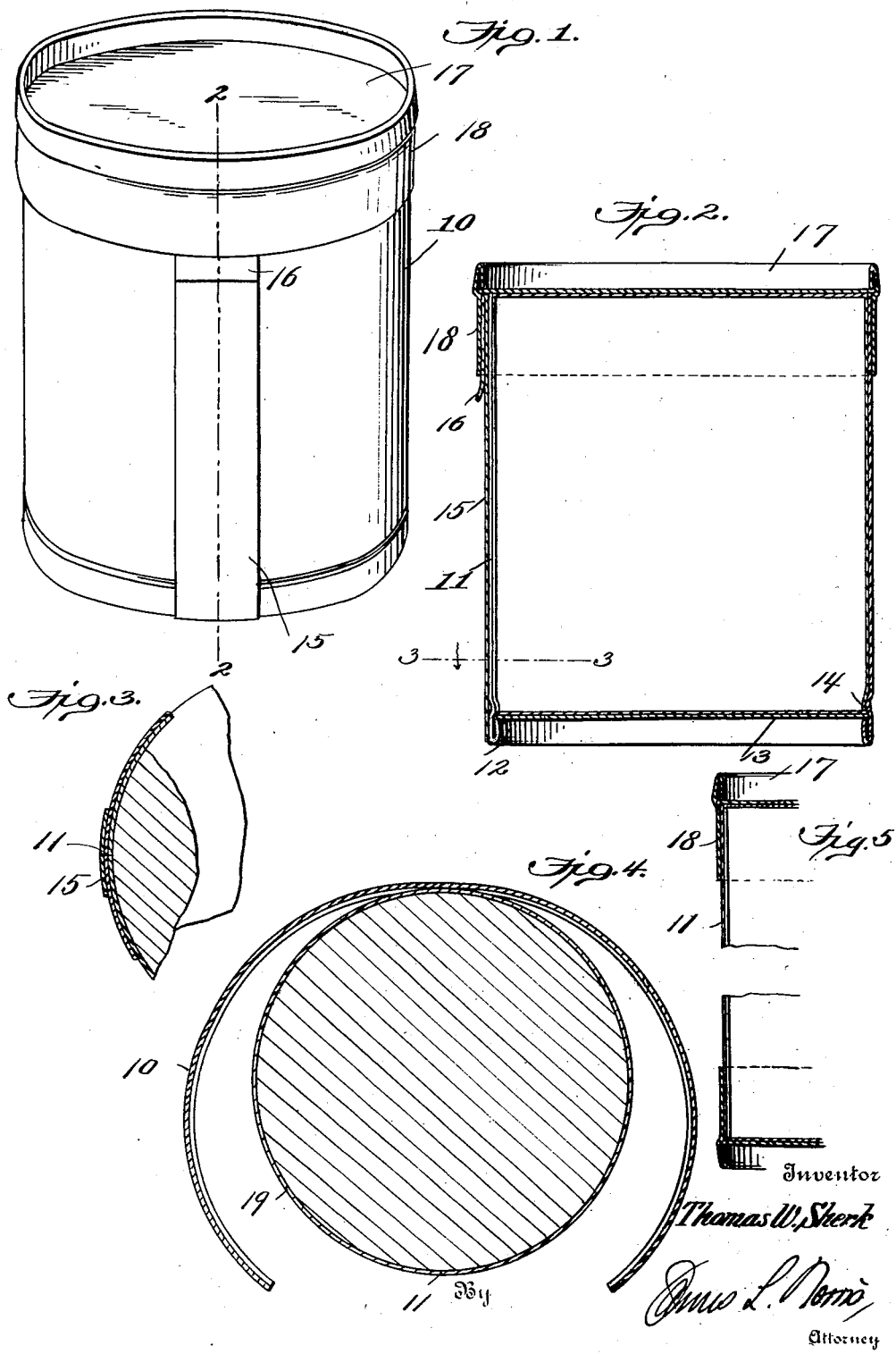

Patented Oct. 14, 1924.

1,511,915

UNITED STATES PATENT OFFICE.

THOMAS W. SHERK, OF JACKSONVILLE, FLORIDA.

ICE-CREAM DISPENSER.

Application filed December 21, 1922. Serial No. 608,362.

*To all whom it may concern:*

Be it known that I, THOMAS W. SHERK, a citizen of the United States, residing at Jacksonville, in the county of Duval and State of Florida, have invented certain new and useful Improvements in Ice-Cream Dispensers, of which the following is a specification.

The present invention relates to containers or cartons, and particularly to containers to be used with substances to be dispensed and sold in measured quantities as in the case of ice cream, gelatines, butter or the like which may be put in the container soft and which are solidified after being placed therein.

An object of the invention is to provide a container from which an article contained therein may be removed without mutilating or otherwise damaging the said article.

Another object of the invention is to provide a container into which may be placed in a soft condition, a substance which will solidify therein, and from which said solidified substance may be removed without mutilating or otherwise damaging the same.

Referring now to the drawings which illustrate one form of my container;

Figure 1 is a perspective view of the container complete.

Figure 2 is a vertical section through the container on line 2—2, Figure 1.

Figure 3 is a fragmentary sectional view on the line 3—3, Figure 2 looking in the direction of the arrows, showing the relation of the parts of the container to the ice cream or other substance contained therein.

Figure 4 is a cross-section through the container and contents showing the container walls in one stage of being removed from the contents.

Figure 5 is a fragmentary view showing a container having a removable cover or lid at both ends.

Referring to the drawings in detail;

The container illustrated in the drawings comprises a cylindrical wall 10, slit on one side at 11 throughout its length and rebent upon itself at the lower end to form a ledge 12 upon which may rest a bottom member 13 when the container is set up for use. The wall of the container may be slightly crimped at 14 just above the ledge, so as to prevent the bottom member from being displaced from its seat upon the ledge. The wall of the container is preferably made of springy material such as cardboard or the like, so that it may be sprung out from a substance held therein and the abutting edges along the longitudinal slit may be fastened together by a strip of adhesive or tape 15, having glue on one surface. The said tape is pasted over the slit throughout the length thereof and its upper end is rebent upon itself and flared outwardly to form a tab 16, the tab being preferably unglued so as to adapt it to be grasped by the fingers for pulling the tape off the container. A suitable cover 17 may be provided having a downwardly extending flange 18 adapted to fit about the upper end of the container wall to hold the latter from spreading.

Before filling the container a lining 19, of paper or other suitable material may be placed therein, the ends of said paper meeting in a line extending longitudinally of the container and preferably coinciding with the slit 11 or slightly overlapping one another, the overlap coinciding with the slit. This latter construction is preferred in order to prevent glue or other foreign material from contaminating the cream. Discs of the same lining material may be placed between the top and bottom of the container and the substances contained therein; for example, ice cream poured into the container while still soft and allowed to harden after it has been placed therein. When the container has been filled, the cover with the lining disc therein may be applied and the container is then ready for transportation from the dispensing station.

When it is desired to remove the contents from the container, the cover may be removed, the tape 16 grasped between the thumb and forefinger and pulled off of the container, whereupon the resilient wall may be spread apart as shown in Figure 4, and the solid block of contents removed without mutilation or otherwise destroying its shape. The block may then be cut into such sections as is desired.

It will be understood that the features of my invention are applicable to cartons or containers having both ends closed by removable covers, as shown in Fig. 5, and in which the bottom 13 is omitted.

It will be further understood that while I have described my invention in connection with a cylindrical container, that the same principle may be applied in containers of other shapes, and I do not wish to limit my invention in any particular except as it shall be limited by the appended claims.

What is claimed as new is:—

1. A container of resilient material having a slit longitudinally thereof, a bottom for said container, a tape removably secured to the side of the container and securing the two edges adjacent the slit together, said tape having a rebent portion at one end forming a finger grip, and a cover having an annular flange adapted to receive therein one end of the container together with the rebent end of the tape.

2. A container of resilient material having a longitudinal slit on one side, the edges of the container adjacent said slit normally abutting each other, a strip of tape adhesively attached to said container and connecting said edges together, said tape being rebent upon itself to form a tab adapted to be grasped by the fingers for withdrawing the same from the container, the walls of said container being folded inwardly upon themselves at one end to provide a ledge, a disc adapted to rest on said ledge to form a bottom for the container, a cover having an annular flange adapted to receive therein one end of the container and to cover the major portion of said tab.

In testimony whereof I have hereunto set my hand.

THOMAS W. SHERK.